United States Patent [19]
Butler

[11] 3,873,862
[45] Mar. 25, 1975

[54] ROTARY SAW
[75] Inventor: Thomas C. Butler, Naperville, Ill.
[73] Assignee: G. W. Murphy Industries Inc., Houston, Tex.
[22] Filed: June 29, 1972
[21] Appl. No.: 267,592

Related U.S. Application Data
[63] Continuation of Ser. No. 36,862, May 13, 1970, abandoned.

[52] U.S. Cl. .............................. 310/50, 143/43 A
[51] Int. Cl. ............................................. H02k 7/14
[58] Field of Search ............ 310/50, 89, 47, 91, 89, 310/66; 143/43 A

[56] References Cited
UNITED STATES PATENTS
| | | | |
|---|---|---|---|
| 2,965,774 | 12/1960 | Rangus | 310/89 |
| 3,344,291 | 9/1967 | Pratt | 310/89 |
| 3,413,498 | 11/1968 | Bowen | 310/47 |
| 3,432,703 | 3/1969 | Sheps | 310/50 |
| 3,456,696 | 7/1969 | Gregory | 310/50 |
| 3,462,623 | 8/1969 | Batson | 310/58 |
| 3,476,960 | 11/1969 | Rees | 310/50 |

*Primary Examiner*—R. Skudy
*Attorney, Agent, or Firm*—Charles F. Lind

[57] ABSTRACT

A portable electric rotary power saw having a motor mounted in a housing which insulates the motor from the outer casing of the saw. The outer casing has a die cast blade guard and gear case portion including the driven saw blade mounted on one end of the motor housing and an end cap portion mounted on the other end of the housing. A sleeve portion of the outer casing is supported between the cap and gear case and surrounds the motor housing to complete the outer casing. A handle is attached to the die cast gear case and is made up of two blades which are joined along a central seam line of the handle. One of the handle halves is a supporting portion which includes a pair of inwardly directed flanges, one at each end of the handle, for securing the handle to the gear case and the other handle half is a supported or cover member which is secured to and supported by the first handle half. The saw includes a base plate which can be angularly and radially adjusted relative to the axis of the saw blade for bevel cuts and adjustable depth of cut. A special air deflector arrangement is provided for directing flow of air from a fan driven by the saw motor toward the cutting line on the work piece to blow away sawdust regardless of angular disposition of the base plate relative to the blade and regardless of the depth of cup adjustment throughout at least a portion of the permitted depth of cut adjustment. A new releasable clamping system involving engagement and disengagement of tapered mating surfaces of parallel pairs of rails and grooves permits radial adjustment of the base plate relative to the blade for depth of cut adjustment and provides positive clamping of the base plate in any adjusted positioned between two limiting stops.

3 Claims, 7 Drawing Figures

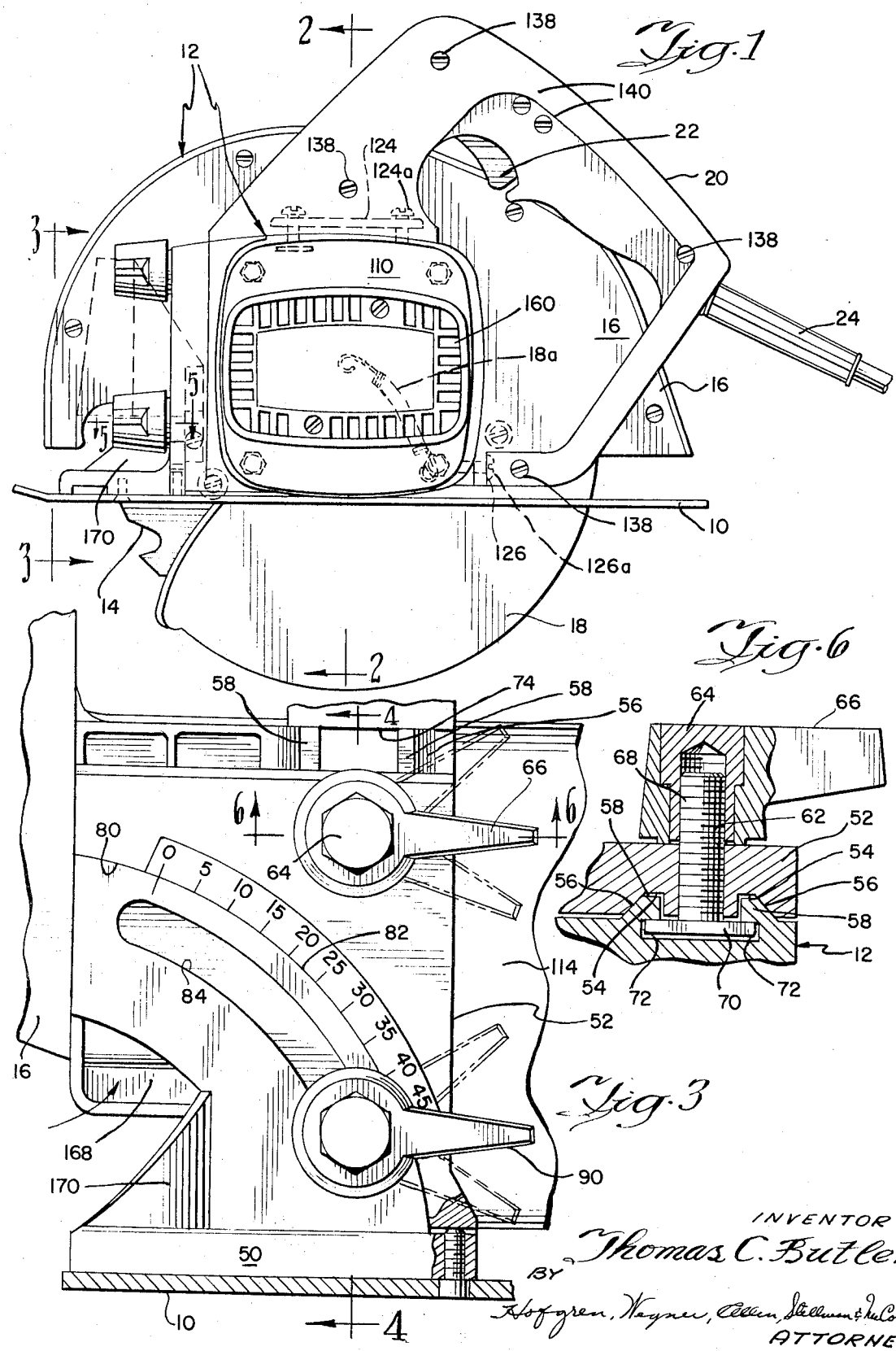

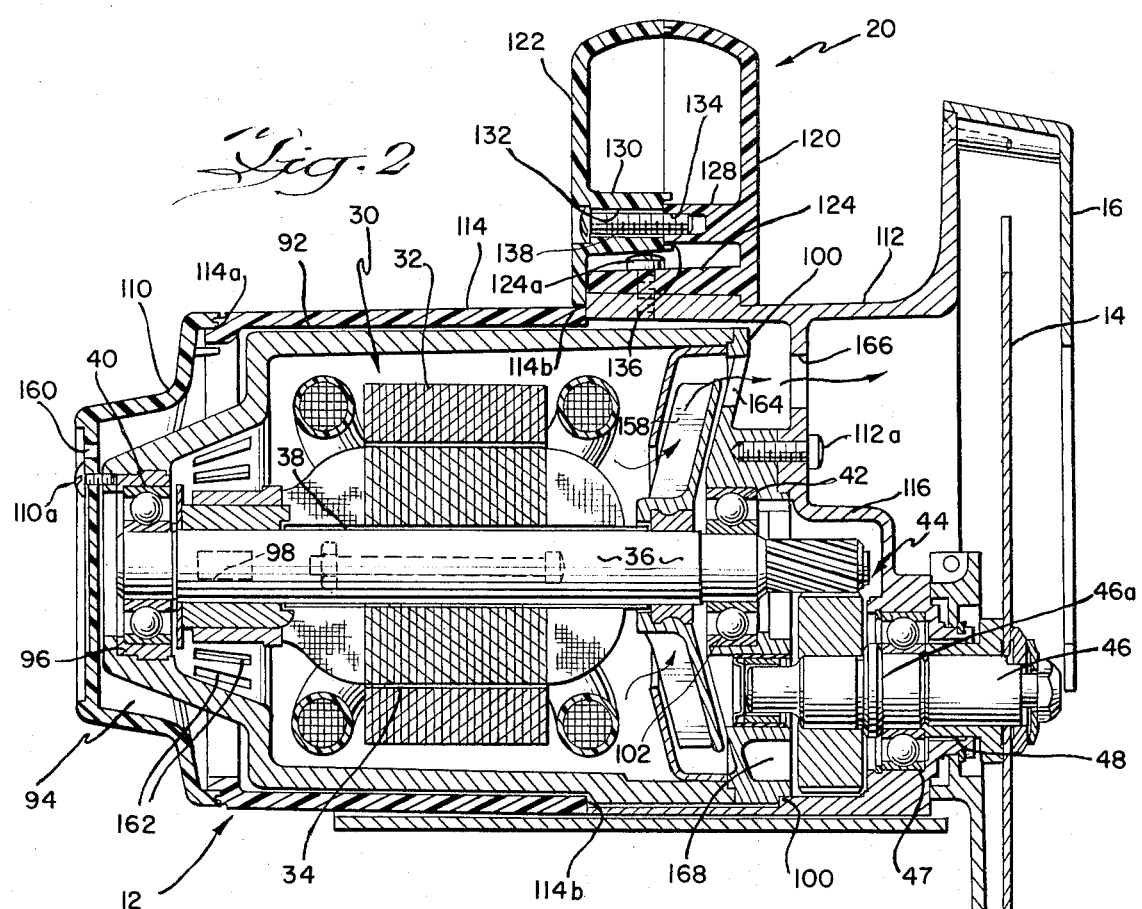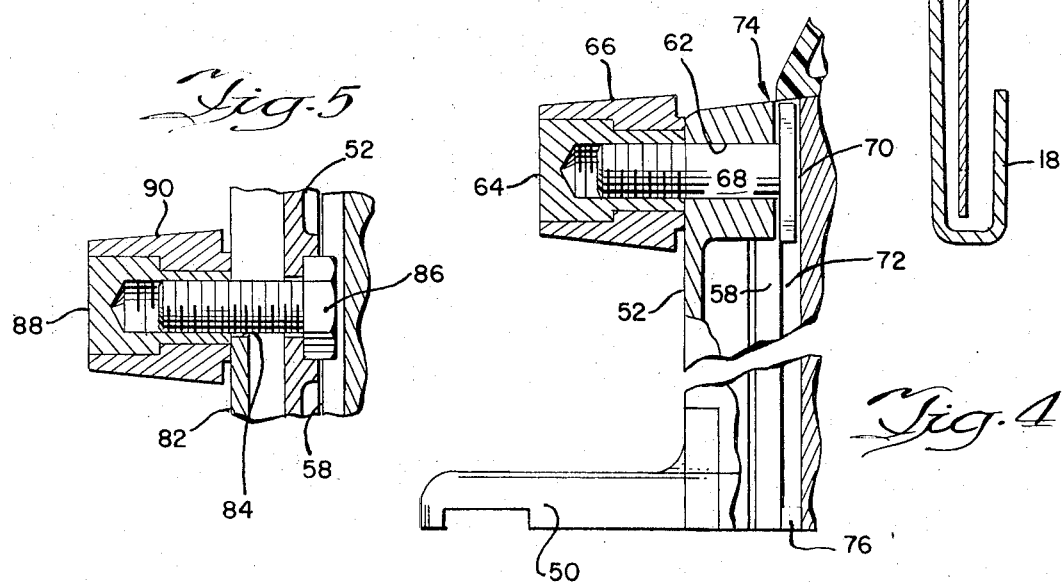

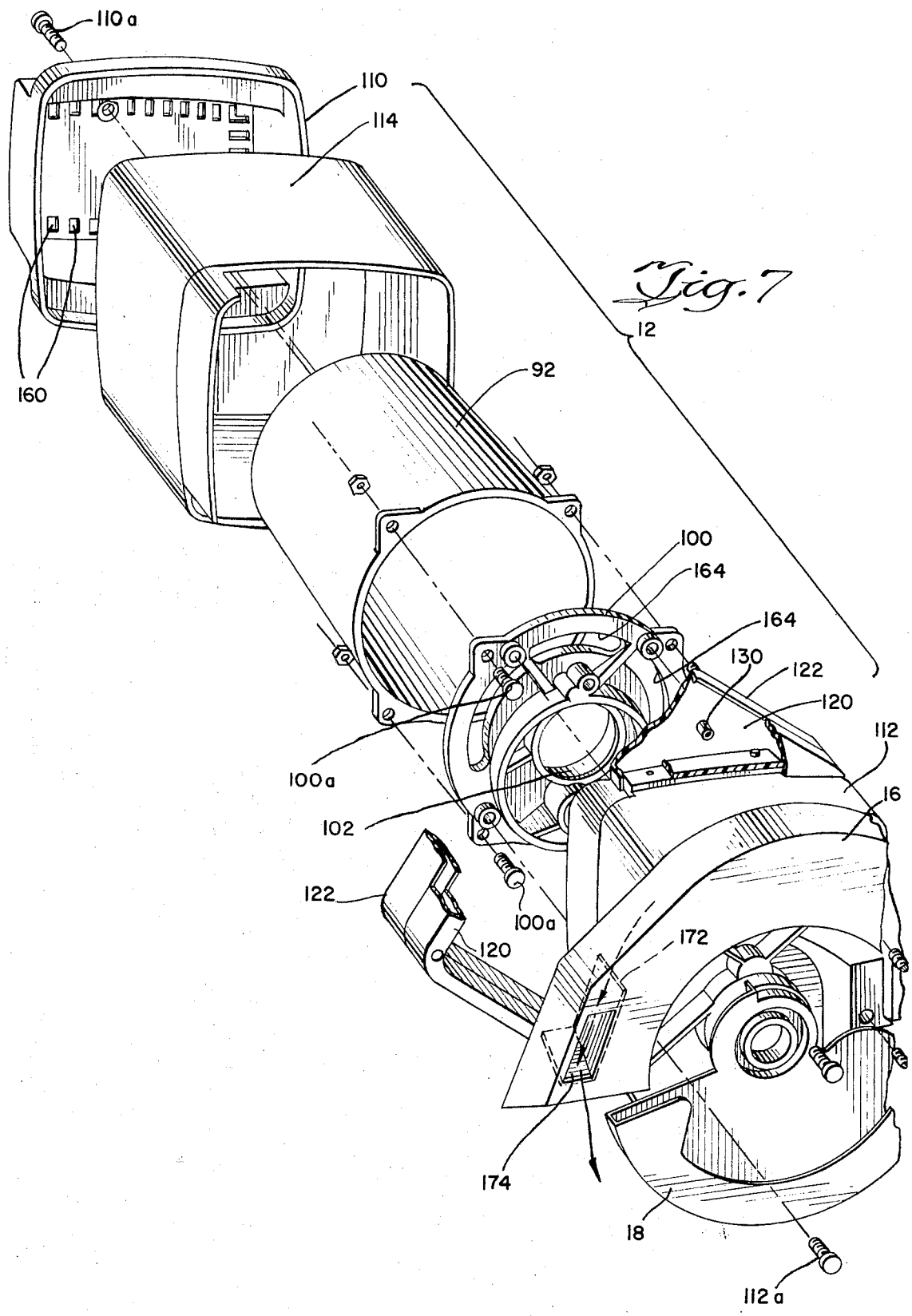

ROTARY SAW

This is a continuation, of application Ser. No. 36,862 filed May 13, 1970 now abandoned.

BACKGROUND OF THE INVENTION

1. Field of the Invention

This invention relates to electric power driven hand tools and especially to improvements in electric power driven hand saws.

2. Brief Description of the Prior Art

The usual power driven hand saw includes a motor mounted in a housing or casing for driving a rotary saw blade. The blade is usually mounted within a blade guard system including a retractable blade guard portion. A handle is secured to the casing and usually includes a trigger switch for ready operation of the device. Most such devices include a fan blade driven by the motor which drives air in the general direction of the saw blade for the purpose of blowing sawdust from the blade and from the work piece, relying usually on the shape of the housing and the blade guard for distribution of air. Normally the entire outer casing is of heavy, thick metal or plastic construction so that the entire device is properly supportable through the casing by way of the handle. The motor, or motor housing if used, is normally also suspended and supported from the structural casing.

SUMMARY OF THE INVENTION

This invention provides new and useful improvements in electric power hand tools and especially power saws. Such improvements include the use of an electrically insulating motor housing as a structural support joining portions of the outer casing of the tool and functioning as a part of a double insulation system for protecting the user against shock. In a preferred form a handle is mounted on a head portion of the outer casing which is in turn secured to one end of the insulating motor housing. The preferred handle is a split handle having a supporting portion with inwardly directed flanges for securing to the tool head portion, and a supported or cover portion which is mated with, secured to and supported by the supporting portion to make up the handle.

Provision is made for bevel cuts by angularly adjusting the saw base plate relative to the blade and for deflecting air onto the work surface to blow away sawdust at the leading edge of the blade regardless of the angular disposition of the blade to the base plate. The device can also be provided with adjustable depth of cut by adjusting the distance of the base plate from the axis of the saw blade. In such an embodiment of the device an improved friction clamp system uses mating beveled surfaces for holding the base plate in its adjusted position against movement relative to the blade.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated.

BRIEF DESCRIPTION OF THE DRAWINGS

FIG. 1 is a plan view from the butt end of a portable power saw of this invention, showing some concealed elements in phantom;

FIG. 2 is an enlarged section along the line 2—2 in FIG. 1;

FIG. 3 is an enlarged section and view along the line 3—3 in FIG. 1;

FIG. 4 is a fragmentary section along the line 4—4 of FIG. 3;

FIG. 5 is an enlarged section along the line 5—5 of FIG. 1;

FIG. 6 is a section along the line 6—6 of FIG. 3; and

FIG. 7 is a perspective fragmentary exploded assembly view of the device of FIG. 1.

DESCRIPTION OF THE PREFERRED EMBODIMENT

Referring first to FIG. 1, the portable electric rotary saw includes an adjustable base plate 10, mounted on a saw casing 12 and having an electric motor driven saw blade 14 within a stationary blade guard 16 as part of the casing head portion. Blade 14 is also provided with a retractable blade guard 18 which is normally urged by a spring shown in phantom at 18a to a position as shown in FIG. 1 generally covering the teeth of blade 14. Secured to casing 12 is a handle 20 for operating the saw and having mounted therein a trigger switch 22 controlling the motor. A power cord 24 extends from handle 20. During operation of the saw as the blade 14 and guard 18 are urged against the work piece, guard 18 retracts against the urging of spring 18a to expose the blade 14 for cutting purposes in the usual manner for such rotary saws.

Referring to FIG. 2, the motor 30 has a field 32 and an armature 34 wound on a shaft 36 with an insulating sleeve 38 provided between the shaft 36 and the armature winding 34. Shaft 36 is mounted adjacent its opposite ends by bearings 40 and 42 and is thereby supported within the device. Shaft 36 delivers rotary power of the motor through a drive means 44 to drive blade 14 which is mounted on a spindle 46 which is mounted for rotation by bearing 47 having its inner race clamped between spacer washer 48 and shoulder 46a of spindle 46, to block any play in the mounting of spindle 46.

Referring to FIGS. 1, 3, 4 and 6, the base plate 10 can be moved to an angular disposition relative to saw blade 14 for the purpose of making beveled cuts or can be moved away from the axis of blade 14 in a vertical direction for decreasing the depth of cut. Accordingly, base plate 10 is mounted on a flange foot 50 of a slide plate assembly 52 which has a pair of parallel vertical grooves 54 in the back or inwardly facing surface thereof. As best seen in FIGS. 3, 4 and 6, each groove 54 has its outer side wall tapered as at 56. Slide plate assembly 52 is mounted on vertically extended parallel rails 58 on the front or leading wall of casing 12 and specifically as part of the head portion of casing 12. The parallel rails 58 are received in the grooves 54 and have their outer sides or edges tapered at 56 to fit flush with the tapered walls of the grooves 54.

A bore 62 is provided through plate assembly 52 between grooves 54 adjacent the upper end thereof. A hex nut 64 secures a handle 66 to the end of a bolt 68 which has a slide plate 70 as the bolt head. Slide plate 70 is received in a slot 72 defined by inwardly facing parallel grooves extending beneath rails 58 in the casing wall. It will be seen that slide plate 70 is free to slide in a vertical direction within groove 72 when nut 64 is loosened on bolt 68.

As best seen in FIG. 4 a stop is provided to limit upward movement of plate 52 on rails 58 and is in the form of an overhanging edge of the casing 12 forming an abutment 74 against which the bolt head slide plate 70 abuts when the slide plate is in the maximum depth of cut position. The bottom stop limiting the downward movement of plate assembly 52 on rails 58 is provided by stop shoulders at 76 which close the lower ends of the inwardly facing grooves forming slot 72. Thus it will be seen that with hex nut 64 loose on bolt 68 plate 52 can be adjusted vertically relative to the axis of blade 14 to any position within the limits defined by stops 74 and 76. The foot 50 of plate assembly 52 carries the base plate 10 with it so that base plate 10 can be thereby moved to a variety of positions relative to the axis of blade 14 within limits permitted by the stops 74 and 76. Upon reaching the desired position of vertical movement, handle 66 is turned to tighten nut 64 which draws the tapered surfaces of grooves 54 and rails 58 into tight friction engagement at 56 to tightly secure and, in effect, wedge rails 58 into grooves 54 thereby tightly holding plate 10 against further movement relative to the axis of blade 14. Referring especially to FIG. 6, it will be noted that clearance is provided between the tops of rails 58 and the bottoms of grooves 54 and between the inwardly facing sides of rails 58 and the inside walls of grooves 54 to provide for maximum wedging action of the rails 58 into the grooves 54 at surfaces 56. The vertical extent of the tapered surfaces of the grooves 54 together with the wedging action when the plate assembly 52 is locked to casing 12, provides a positive interlock which prevents any relative sidewise or vertical movement so that the predetermined relationship between the base plate 10 and the blade 14 is maintained.

Base plate 10 can also be angularly adjusted relative to blade 14 to provide for beveled cuts. Accordingly, slide plate assembly 52 includes an arcuate cut away portion at 80 which receives an arcuate slide member 82 having a slide slot 84 generally parallel with the outer arcuate surface of member 82. The flange foot 50, to which base plate 10 is directly secured, is an integral portion of the arcuate slide member 82. A bolt 86 (FIG. 5) has its head portion secured against turning within a receiver on the back wall of the vertically movable slide plate assembly 52 and extends outwardly through the slide plate and through slot 84 in arcuate slide member 82 and is capped by a hex nut 88 which secures a handle 90 in position over the end of bolt 86. It will be readily seen that turning handle 90 to loosen nut 88 will permit arcuate slide member 82 to slide through a downward and clockwise arc as viewed in FIG. 3 to any position, e.g., up to 45°, permitted by extent of slot 84. This will dispose base plate 10 at an angle to blade 14 and the angle of disposition can be correlated with a suitable marked reference gauge as shown in FIG. 3. Re-tightening handle 20 then clamps arcuate slide member 82, and therefore base plate 10, in the desired angular disposition relative to blade 14 for making beveled cuts with the saw.

The center of the circle forming the arcuate slot 84 is an imaginary point at the intersection of the plane of the base plate 10 and the blade 14 so that alignment for a cut can be easily accommodated.

In the illustrated device, the electric motor is contained within an insulating motor housing which forms a prime structural element for the device. Referring especially to FIGS. 2 and 7, the motor housing is a cylindrical structural insulating housing 92 having a generally closed end portion 94 with a bearing receiver 96 receiving bearing 40 of motor 30 and having integral brush mounting receivers as indicated at 98. The motor field 32 is secured within housing 92 against rotation relative thereto by suitable means (not shown). The front or open end of housing 92 is closed by a closure plate 100, secured thereto by suitable bolts 100a and has a bearing receiving opening 102 therethrough for receiving bearing 42 and permitting the geared end of shaft 36 to extend beyond the closure plate 100. Housing 92 insulates against spark jump from the windings of motor 30 to the user or to the cast metal head portion of the saw while sleeve 38 insulates shaft 36 from the windings of motor 30 to prevent shock via shaft 36 and the casing head or blade 14 to the user in case of malfunction of the motor. Thus the user is double insulated against possible shock.

The outer casing 12 includes an end cap 110 which may be made of light weight plastic material and which is secured by screws 110a to the end portion 94 of the motor housing 92. The saw upper guard and gear case, i.e., head portion 112 of casing 12 is preferably a strong die cast metal case and has a cross-plate 116 spanning the inner surface thereof and which is secured by screws 112a to the closure plate 100. The remainder of casing 12 is preferably a light weight thin plastic sleeve portion 114 which is captured or held between end cap 100 and head 112 and is generally spaced outwardly from and around motor housing 92. One end of sleeve 114 is provided with a suitable flange and groove arrangement at 114a cooperating with the lip of end cap 110 to support one end of sleeve 114 and the other end of sleeve 114 is received as at 114b by portions thereof in mating abutment with portions at the rear end of head 112.

It will be seen from the description of casing 12 that the structural insulating housing 92 is secured to the structural die cast head 112 and housing 92 in turn supports the structural end cap 110 with the non-structural intermediate sleeve portion 114 captured and held between end portion 110 and head 112 for support thereof. The handle 20 is secured directly to the head portion 112 to firmly support the entire tool.

Handle 20 is a vertically split hollow handle having a support side portion or half 120 and a supported or cover side portion or half 122, each of insulating material to further protect the user against possible shock. The support half 120 is provided with two inwardly extending mounting flanges 124 and 126 (see FIGS. 1 and 2) and each half 120 and 122 is provided with inwardly extending bosses 128 and 130 which meet in registry at about the center line within the hollow handle. Each boss 130 is provided with a bore from the outer surface through the length of boss 130 and each boss 128 is provided with a bore at the inner end thereof having a female thread as at 134 for receiving a threaded bolt 138 extending through bore 132. For better registry of each boss 130 with its opposing boss 128, each boss 130 has its inner end larger than the inner end of boss 128 and includes a depression as at 136 for receiving the end of boss 128 and assuring registry of the female thread 134 with bore 132.

The handle, which is much stronger than the conventional split handle, is assembled on casing 12 by securing flanges 124 and 126 of support portion 120 to the outer surface of the die cast metal head portion 112 using suitable bolts at 124a and 126a. Thereafter, handle portion 122 is mated with handle portion 120 and secured thereto via volts 138. Prior to assembly of handle 20, the trigger switch 22 can be secured by suitable means such as bolts within with either half of handle 20. Preferably switch 22 is secured within support half 120 making it more easily accessible for cleaning, repair or replacement purposes.

An air flow system is provided for cooling the motor 30, for cleaning blade 14 and for blowing sawdust from the cut line on the work piece surface. Accordingly, a fan blade 158 is secured to shaft 36 of motor 30 and is driven by motor 30. Fan blade 158 draws air in through air intake ports 160 in cap 110 and through openings 162 in end 94 of housing 92 to cool the motor 30. Fan blade 158 delivers the air beyond motor 30 through ports 164 in end plate 100 and then through both a port 166 in cross plate 116 and a lateral port 168 (Fig. 3) through the side wall of head 112. Cross plate 116 blocks stray recirculation of air and sawdust back into casing 12. The air delivered through port 168 is directed by a deflector 170 toward the leading edge of blade 14 for blowing sawdust from the cut line on the work piece.

The deflector 170 is an integral part of arcuate sliding member 82 and is moved with plate 10 throughout its angular and vertical adjustment positions so that it is always adjacent the leading cutting edge of blade 14. Thus, regardless of the angular adjustment of base plate 10 relative to blade 14 deflector 170 still directs the air toward the cut line assuring removal of sawdust for better sighting of the cut line. Additionally, deflector 170 assures flow of air to the cut line throughout at least an important portion of the total depth adjustment of plate 10 relative to the axis of blade 14.

The air delivered through port 166 impinges against blade 14 at its upper extent within blade guard 16 and blows sawdust from the blade and also delivers air into guard 16 for delivery by the rotary action of blade 14 in a clockwise direction as viewed in FIG. 1 around the periphery of guard 16. At the rear of guard 16 is a sawdust-collecting baffle 172 which diverts flowing sawdust from the periphery of guard 16 to a laterally directed chute 174 which, in turn, deflects the sawdust from the device and laterally away from blade 14.

What is claimed is:

1. An electric power tool, comprising an electric motor unit and an output working head, said motor unit having a structural and electrically insulating housing generally cylindrical in shape with one end substantially closed and the opposite end generally open, a closure plate secured across the open end of the housing, opposed bearings supported in said housing at the substantially closed end thereof and in said closure plate, a motor shaft rotatably supported in said bearings and having an output end projected beyond the closure plate, said working head being of structural die cast and having a mounting wall and a circumferential wall and means connecting the closure plate and the mounting wall together to have the motor unit supported solely from the working head, an operable output member carried by the working head and means connecting the motor shaft output end with the working output member, a tool holding support secured directly and only to the working head circumferential wall, and cover means including a generally tubular element fitted over the motor housing and butted against the working head circumferential wall and an end cap secured to the generally closed end of the housing and maintaining the cover means in snug butted relation with the working head, and the cover means being of electrical insulating material and of such thickness as to be non-load bearing or non-supporting.

2. An electric power tool according the claim 1, wherein said tool holding support comprises a handle having bilateral mating handle elements, and first means for securing one of the handle elements directly to the working head circumferential wall and second means for securing the other of the handle elements to said one handle element, whereby the first securing means is covered and made nonaccessible by said mated handle elements.

3. An electric power tool according to claim 2, wherein each of said handle elements has bosses projected inwardly toward the opposite respective handle element and being disposed in generally axial mating relation, wherein the bosses of the first respective handle element is larger than the bosses of the opposite handle element and each small boss is telescopically received in a counter bore in the associated larger boss, and wherein the second mentioned securing means includes screw means extends through an opening in each larger boss for threaded engagement with the related smaller boss.

* * * * *